United States Patent Office 3,521,686
Patented July 28, 1970

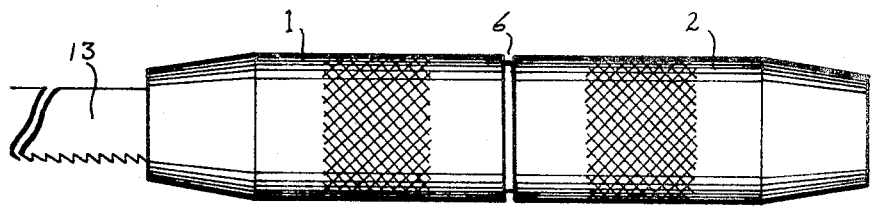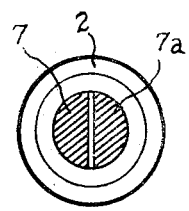
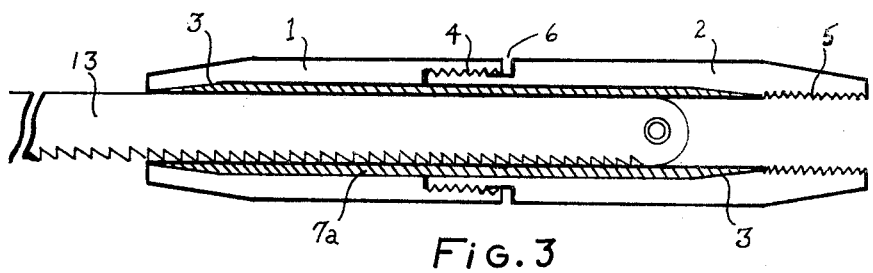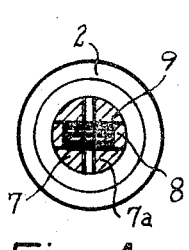
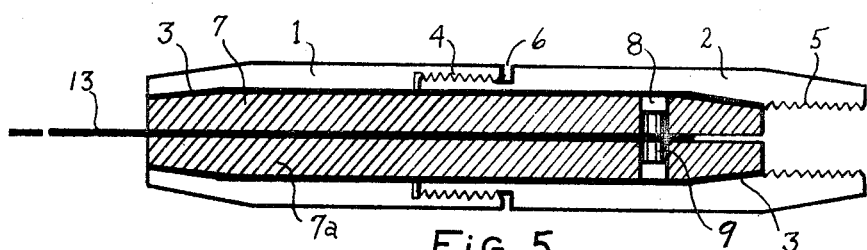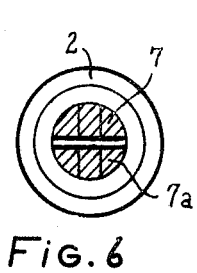
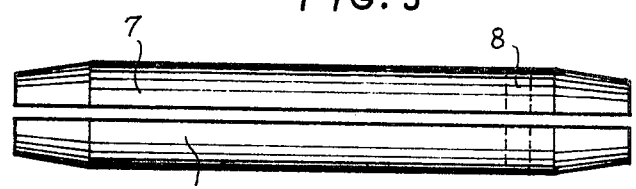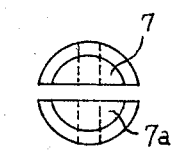
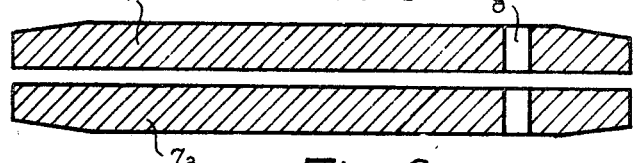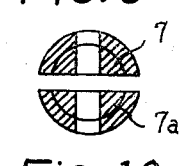
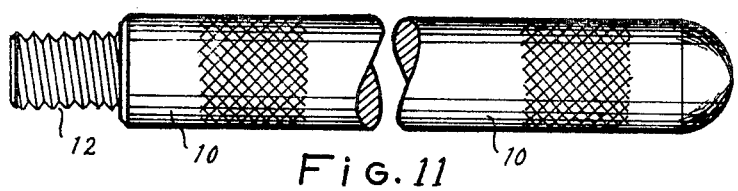

3,521,686
ADJUSTABLE SAW BLADE HOLDER
Gordon H. Weinmann, 15531 Victory Blvd.,
Van Nuys, Calif. 91406
Filed July 17, 1967, Ser. No. 659,273
Int. Cl. B25g 1/06; B27b 21/00
U.S. Cl. 145—108          2 Claims

ABSTRACT OF THE DISCLOSURE

A device having a hollow tube containing two halves that screw together and force a set of internal collets to close which grips and holds firm a blade that has been inserted in one end.

BRIEF SUMMARY OF THE INVENTION

An elongated handle made of a non-conductive material such as, plastic, lucite, synthetic resin, or glass. My present invention relates to improvements in tool handles and, more particularly, to a novel handle for a hacksaw blade.

Another object of this invention is to provide a novel handle applicable to a hack saw blade in different adjustments to vary the operative length of the blade and held by friction where positioned on the blade. And for heavy duty service, the blade can be positioned and pinned in two different lengths within the jaws of the handle.

Another object of this invention is to provide a handle that is fully insulated from the hack saw blade, when the blade is positioned in the handle.

A still further object of this invention is to provide a handle for a hack saw blade that can be fitted with an extension to provide a variable length.

And finally, the invention further consists of making the handle proper, in two pieces. The collets, or jaws, in two pieces, and the extension in one or more pieces.

Further objects and advantages of the invention will become apparent and clear from the following description and claims, and from the accompanying drawings, wherein:

FIG. 1 is a longitudinal view of the handle proper, with both halves of handle fitted together and holding hack saw blade.

FIG. 2 is an elevation of the handle looking into the threaded end.

FIG. 3 is a longitudinal sectional view of the handle showing the hack saw blade positioned in the collets.

FIG. 4 is an elevation of the handle and a sectional end view of the positioned collets with the drive pin place.

FIG. 5 is a longitudinal sectional view of the two handle halves screwed together, the two collet halves with the hack saw blade and driving pin in position.

FIG. 6 is a elevation end view of the handle with a cross sectional view of the collet showing hole for the drive pin.

FIG. 7 is a side elevation of the two halves of the jaws or collets showing the hole for the drive pin.

FIG. 8 is an elevation of the end of FIG. 7.

FIG. 9 is a longitudinal sectional view of the two collet halves showing hole through the end of both pieces.

FIG. 10 is a sectional view of the end of the collets.

FIG. 11 is a side elevation of the extension handle in an exploded view showing one end threaded to mate with the threaded end of the handle proper in view FIG. 1.

Referring to the drawing, the handle proper, is made in two halves, 1, and 2. The handle can be made of a synthetic resin, glass, plastic, or any other non-conductive material.

The two handle halves, 1and 2 are screwed together to form an externally tubular shape that is tapered symmetrically from a larger diameter to a smaller diameter at both ends. This is shown in FIGS. 1, 3 and 5. Each half of the handle 1 and 2 has a portion of the outer surface knurled to accord a good gripping surface to the hand. The total length and diameter of the handle is of such as to be suitable to the hand.

In FIGS. 3 and 5 is shown the handle half 1, with an internal thread. The handle half 2, has a male thread to engage the female thread of 1, and thereby draw the two handle halves together as indicated by 4, in FIGS. 3 and 5.

As is shown and illustrated in FIGS. 3 and 5 the handle halves, 1 and 2 are drawn together by the threaded portion at 4 thus forming an internal cavity or pocket that is cylindrical in shape and with symmertically tapered ends, which is indicated at 3 in FIGS. 3 and 5. This cavity, or pocket is of a longitudinal length and cylindrical diameter to receive the two collet halves 7 and 7a shown in FIGS. 3, 5, 7 and 9. The total length of the collets or gripping jaws, is slightly longer than the total length of the cavity that is formed inside the handle when the two handle halves are screwed together. This causes the two handle halves to gap and not close completely, as is shown by 6 of FIGS. 1, 3 and 5.

As is illustrated in the drawing, this difference between the length of the collets and the length of the cavity existing in the handle, causes the shorter length of the handle cavity to exert pressure on the tapered or conical ends of the collets 3 shown in FIGS. 3 and 5. The action resulting from rotating or screwing the two handle halves together by means of the thread 4 shown in FIGS. 3 and 5 forces the collet halves 7 and 7a to close together and grip the hack saw blade 13 as is shown in FIGS. 3 and 5.

Referring to FIGS. 7 and 9 the collet halves 7 and 7a are perfectly round when the hack saw blade 13 is positioned between them and the diameter is slightly less than that of the cavity formed in the handle halves 1 and 2. Also, the tapered ends of the collets 7 and 7a are symmetrical and can be turned end for end within the handle to match the symmetrical tapers of the handle 3 as illustrated in FIGS. 3 and 5. This action permits a two position use of the hack saw blade when the hardened steel drive pin 9 is inserted in the hole 8 with the blade positioned between the collet halves 7 and 7a shown in FIGS. 3, 4 and 5. The position that is shown illustrates much of the hack saw blade 13 retained in the length of the handle. However, when the collet halves 7 and 7a are turned end for end, less blade is gripped between the collets and more blade or length of blade is exposed.

While still referring to FIGS. 7 and 9 is a hole 8 through the end of each collet half. This hole is of a diameter to permit a slip fit for the drive pin 9 which is of a length slightly shorter than the diameter of the two collet halves together. The diameter of the pin to be under the hole size found in each end of a conventional hack saw blade. The collet halves 7 and 7a can be made of a non-conductive material such as the handle halves 1 and 2. Or the collets can be made of a conductive material since the handle proper 1 and 2 is made of a non-conductive material.

Referring to FIGS. 3 and 5 and removing the drive pin 9 from the hole 8 in the collet halves 7 and 7a the hack saw blade 13 is held and gripped by friction, since the flat inner sides of the collets can be forced very tightly together by screwing the two handle halves 1 and 2 together with a firm grip of the hands. Using this method to grip the blade, it is obvious the handle 1 and 2 with the collets 7 and 7a may be adjusted longitudinally on the blade 13 to vary the operative length of the blade 13. As is also shown in FIGS. 3 and 5 the handle halves 1 and 2 are open the entire length with an internal diameter not less than the width of the blade 13. This permits the blade 13 to pass completely through the handle. Also as shown the handle half 2 has an internal thread 5 extending from the end to the start of the internal taper 3. This threaded portion is for the engagement of 12, the threaded portion on the end of the extension handle 10, shown in FIG. 11.

Referring to FIG. 11 is shown a longitudinal side elevation of the extension handle 10 made of a non-conductive material such as the handle proper 1 and 2 is made of. This extension 10 is of a round diameter and length to be desirous to the user. One end is of a reduced diameter and threaded to insert into the threaded end 5 of handle 2 which affords the use of the hack saw blade 13 in inaccessible places, to a hack saw blade used with a conventional hack saw frame.

While the description of the handle proper 1 and 2 and the components disclosed herein have been in conjunction with the use of a hack saw blade, it will be understood that the range and scope of this handle to adopt or employ a wide variety of tools, other than a hack saw blade, is obvious.

Obviously many modifications and variations of the present invention are possible in light of the disclosures and definitions presented. It is, therefore, to be understood that within the scope of the appended claims the invention may be practiced otherwise than as specifically described.

Therefore, what I claim is new and desire to secure by Letters Patent is:

1. In an article of manufacture, a non-conductive tool handle made in two parts and provided with threaded ends to engage and thus form an elongated holder having a cylindrical cavity with symmetrical conical ends, a collet composed of two longitudinal parts and having aligned pin holes in one end, and having symmetrical conical ends, to occupy said cavity, and being provided with means for gripping and holding a hack saw blade in a plurality of fixed positions with varying operative free extents of the blade projecting outwardly from its front end, pin means associated with said blade and said pin holes to positively secure said blade to said collet, the back end of said handle being provided with an extension handle.

2. In an article of manufacture, a non-conductive tool handle made in two parts, and provided with threaded ends to engage and thus form an elongated holder having a cylindrical cavity with symmetrical conical ends, a collet composed of two longitudinal parts and having aligned pin holes in one end of said collets, and having symmetrical conical ends, to occupy said cavity in said holder, and being provided with means for gripping and holding a hack saw blade or tool in a plurality of fixed positions with varying operative free extents of said blade or tool projecting outwardly from said handle's front end, pin means associated with said blade and said pin holes to positively secure said blade to said collet, and the back end of said handle having a threaded socket, thereby providing the means to engage an extension handle having an external threaded end.

References Cited

UNITED STATES PATENTS

| | | |
|---|---|---|
| 1,406,841 | 2/1922 | Foss. |
| 3,338,278 | 8/1967 | Reuterfors _____ 145—108 X |
| 2,966,931 | 1/1961 | Dreier _____ 145—108 X |

ROBERT C. RIORDON, Primary Examiner

R. V. PARKER, JR., Assistant Examiner

U.S. Cl. X.R.

30—329; 279—56